(12) United States Patent
Palfreyman et al.

(10) Patent No.: US 9,246,425 B2
(45) Date of Patent: Jan. 26, 2016

(54) APPARATUS AND SYSTEMS FOR ENGINE AND GENERATOR CONTROL WITHIN AN AIRCRAFT

(71) Applicant: Gulfstream Aerospace Corporation, Savannah, GA (US)

(72) Inventors: Gary Palfreyman, Savannah, GA (US); Michael Knight, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 32 days.

(21) Appl. No.: 14/264,751

(22) Filed: Apr. 29, 2014

(65) Prior Publication Data

US 2015/0311841 A1 Oct. 29, 2015

(51) Int. Cl.
*H02P 9/04* (2006.01)
*H02P 9/02* (2006.01)
*B60L 9/00* (2006.01)

(52) U.S. Cl.
CPC ......................... *H02P 9/02* (2013.01)

(58) Field of Classification Search
USPC .................. 322/15; 310/156; 701/22
See application file for complete search history.

(56) References Cited

U.S. PATENT DOCUMENTS

| | | | | |
|---|---|---|---|---|
| 6,625,525 B2* | 9/2003 | Yoshino et al. | | 701/22 |
| 6,750,557 B2* | 6/2004 | Poteet et al. | | 290/52 |
| 6,912,451 B2* | 6/2005 | Poteet et al. | | 700/287 |
| 7,023,150 B2* | 4/2006 | Hisada et al. | | 318/34 |
| 7,042,111 B2* | 5/2006 | Poteet et al. | | 290/52 |
| 8,030,905 B2 | 10/2011 | Petkov | | |
| 8,040,010 B2* | 10/2011 | Kamiya et al. | | 310/156.57 |
| 8,218,341 B2 | 7/2012 | Wiegman et al. | | |
| 8,370,014 B2* | 2/2013 | Ueno | | 701/22 |
| 2002/0062184 A1* | 5/2002 | Yoshino et al. | | 701/22 |
| 2002/0171383 A1* | 11/2002 | Hisada et al. | | 318/432 |
| 2003/0052485 A1* | 3/2003 | Poteet et al. | | 290/4 R |
| 2003/0060907 A1* | 3/2003 | Poteet et al. | | 700/75 |
| 2004/0098142 A1* | 5/2004 | Warren et al. | | 700/22 |
| 2004/0124332 A1* | 7/2004 | Takenaka et al. | | 248/648 |
| 2005/0116473 A1* | 6/2005 | Poteet et al. | | 290/7 |
| 2007/0112496 A1* | 5/2007 | Ji | | 701/70 |
| 2009/0230802 A1* | 9/2009 | Kamiya et al. | | 310/156.53 |
| 2010/0312427 A1* | 12/2010 | Ueno | | 701/22 |
| 2013/0079959 A1* | 3/2013 | Swanson et al. | | 701/19 |
| 2013/0111917 A1 | 5/2013 | Ho et al. | | |
| 2015/0203101 A1* | 7/2015 | Liu | | B60K 6/48 701/22 |
| 2015/0224981 A1* | 8/2015 | Fujishiro | | B60W 20/00 701/22 |

* cited by examiner

*Primary Examiner* — Pedro J Cuevas
(74) *Attorney, Agent, or Firm* — Ingrassia, Fisher & Lorenz PC

(57) ABSTRACT

A system is provided for engine and generator control. The system includes a compound AC generator, a generator control unit (GCU) module and an engine electronic controller (EEC) module. The compound AC generator includes a shaft, and a permanent magnet generator (PMG) configured to be driven by the shaft to generate an AC power signal. The GCU module is configured to control the compound AC generator. The PMG is coupled to the GCU module and the EEC module such that it is configured to simultaneously supply the AC power signal to the GCU module and to the EEC module.

23 Claims, 3 Drawing Sheets

APPARATUS AND SYSTEMS FOR ENGINE AND GENERATOR CONTROL WITHIN AN AIRCRAFT

TECHNICAL FIELD

The present invention generally relates to aircraft, and more particularly relates to apparatus and systems for engine and generator control within an aircraft.

BACKGROUND

An aircraft includes an engine and an electric power generator that is the primary power supply for the aircraft when the engine is running. An Engine Electronic Controller (EEC) is a processor that monitors and controls parameters (e.g., fuel flow, pressures, temperatures, rpm, etc.) needed to make an aircraft's engine run as required. The EEC has a dedicated, independent power supply, called a Permanent Magnet Alternator (PMA). The PMA can be mounted on the engine gearbox, and serves as the primary electric power source for the EEC when the engine is running (e.g., rotating). When the engine is not running or when electrical power is not available from the PMA, electrical power from the aircraft is used to power the EEC.

A Generator Control Unit (GCU) is controller that monitors and controls electric power generated by the generator. The generator includes a small Permanent Magnet Generator (PMG) built into it for powering the GCU. The PMG has a similar power output as the independent PMA that powers the EEC.

It would be desirable to provide improved systems for controlling the generator and engine(s) of the aircraft. Other desirable features and characteristics of the present invention will become apparent from the subsequent detailed description and the appended claims, taken in conjunction with the accompanying drawings and the foregoing technical field and background.

BRIEF SUMMARY

In one embodiment, a system is provided that includes an engine, a compound AC generator, a generator control unit (GCU) module and an engine electronic controller (EEC) module that is configured to control the engine. The compound AC generator includes a shaft, a permanent magnet generator (PMG) configured to be driven by the shaft to generate an AC power signal. The GCU module is configured to control the compound AC generator. In accordance with the disclosed embodiments, the PMG is coupled to the GCU module and the EEC module such that it is configured to supply the AC power signal to the GCU module and to the EEC module.

In another embodiment, a combined engine electronic controller-generator control unit (EEC-GCU) module is provided that is configured to be powered by a common AC power signal. The combined EEC-GCU module includes a generator control unit (GCU) module configured to perform GCU functions to control a compound AC generator, and an engine electronic controller (EEC) module configured to perform EEC functions to control an engine.

BRIEF DESCRIPTION OF THE DRAWINGS

The present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, which is defined by the claims. Furthermore, there is no intention to be bound by any theory presented in the preceding background or the following detailed description.

In accordance with the disclosed embodiments, the existing Permanent Magnet Generator (PMG) embedded in an aircraft generator provides power to the Engine Electronic Controller (EEC). In addition, in some embodiments, the generator control functions that are normally implemented within the dedicated Generator Control Unit (GCU) can be implemented within the EEC. For example, in one implementation, the GCU hardware is co-located with EEC and the processor of the EEC can perform the generator control functions. For example, the processor of the EEC is configured to control the GCU control loops and provides commands to GCU hardware. As such, generator control functions normally performed by the dedicated GCU are moved to the EEC and onto the engine where the generator under control is physically mounted. Accordingly, the disclosed embodiments can eliminate the need for implementing an independent, dedicated Permanent Magnet Alternator (PMA) that powers the EEC as well as the need for other hardware such as the dedicated GCU processor, wiring between the EEC and the PMA, and/or a separate housing for the GCU that would normally be mounted within the aircraft. Greater integration of system components with similar functions and capabilities can reduce overall aircraft weight and drag. Elimination of the dedicated PMA from the engine accessory gearbox also reduces the weight and cost of the gearbox. This in turn reduces mechanical parasitic losses from the engine by reducing the number of shafts and gears in the engine accessory gearbox. A smaller engine gearbox also allows a smaller engine nacelle, which can help reduce overall aircraft drag. As such, the disclosed embodiments can allow for weight reduction, gearbox optimization and component reduction.

Figure 1:
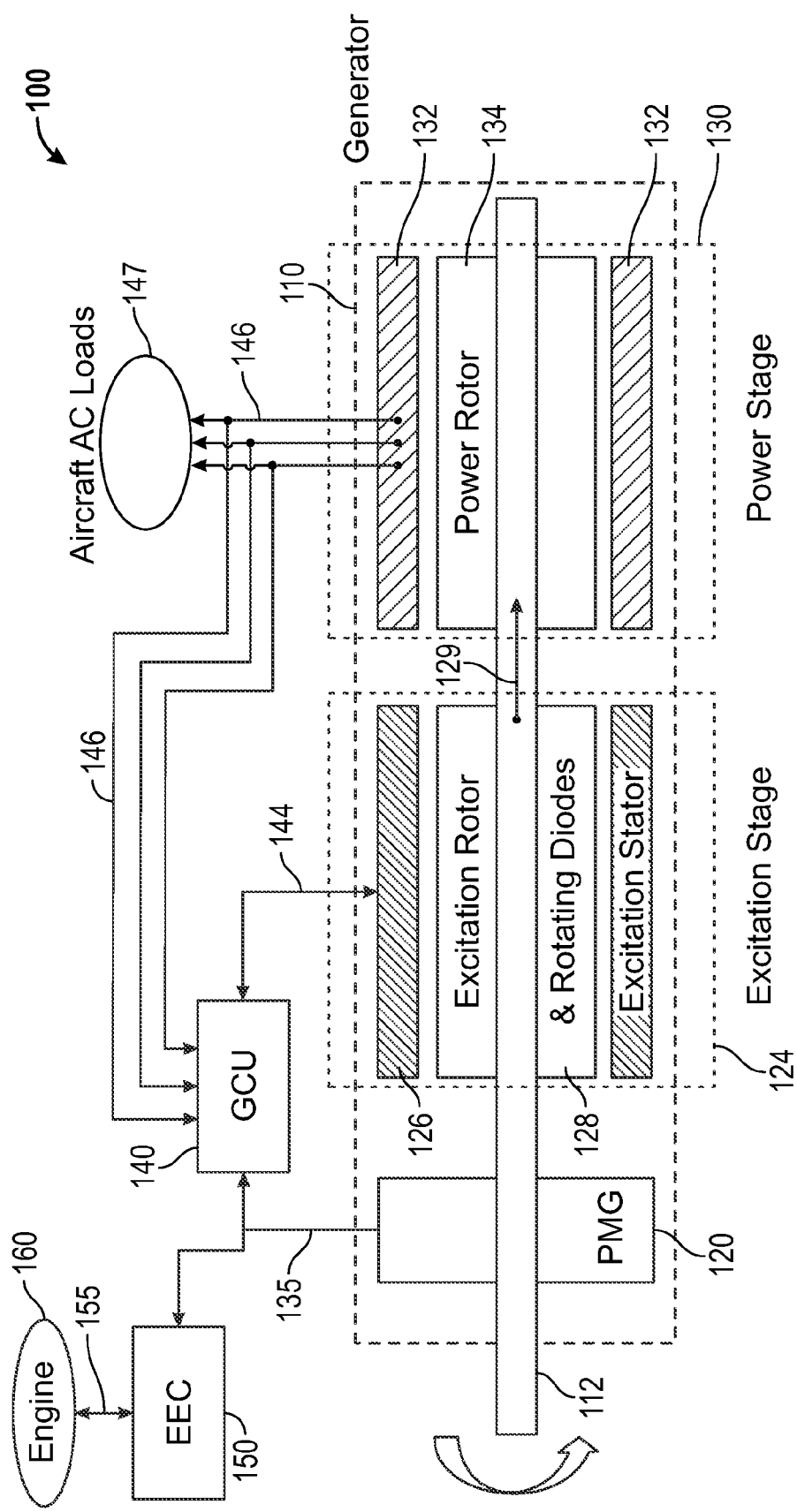
FIG. 1 is a block diagram of a system implemented within an aircraft in accordance with one exemplary implementation of the disclosed embodiments.

FIG. 1 is a block diagram of a system 100 implemented within an aircraft (not illustrated) in accordance with one exemplary implementation of the disclosed embodiments. The aircraft is not illustrated for sake of simplicity, but as is known in the art, the aircraft includes an engine 160.

The system 100 includes a compound AC generator 110, a generator control unit (GCU) module 140 and an engine electronic controller (EEC) module 150 that is configured to control the engine 160.

The compound AC generator 110 includes a shaft 112, a permanent magnet generator (PMG) 120, an excitation motor stage 124, and a power motor stage 130. The excitation motor stage 124 includes an excitation rotor 128 encompassed by an excitation stator 126 surrounding the excitation rotor 128. The excitation rotor 128 includes windings that have rotating diodes to rectify a regulated DC output signal 144 generated by the GCU 140. The power stage 130 includes a power rotor 134 encompassed by a power stator 132. The power stator 132 is configured to generate three-phase AC voltage output signals 146 that are supplied to various aircraft systems 147, and that are also monitored by the GCU module 140.

In accordance with some of the disclosed embodiments, the PMG 120 is configured to be driven by the shaft 112 and to generate an AC power signal 135. The AC power signal 135 is a variable frequency, variable voltage signal. The PMG 120 supplies the AC power signal 135 to the GCU module 140 and to the EEC module 150 to power the GCU module 140 and the EEC module 150. In other words, in accordance with the disclosed embodiments, the AC power signal 135 from the PMG 120 provides electrical power to both the EEC module 150 and to the GCU module 140. The PMG 120 is different than an independent permanent magnet alternator (PMA) that is conventionally used to power the EEC. Notably, in accordance with the disclosed embodiments, the aircraft does not need to include a separate permanent magnet alternator (PMA) to supply electrical power the EEC module 150. Further, there is no need to connect or couple the EEC module 150 to a separate PMA.

The generator control unit (GCU) module 140 receives the AC power signal 135 and the three-phase AC voltage output signals 146. The GCU module 140 is configured to control the compound AC generator 110 to regulate the three-phase AC voltage output signals 146 generated by the power motor stage 130. To explain further, the GCU module 140 uses the three-phase AC voltage output signals 146 and the AC power signal 135 to regulate a DC output signal 144 that it outputs to the excitation stator 126. To explain further, to compensate for changes in aircraft electric power demands (e.g., in response to changes in power consumption by 147 such as when engine speed changes), the GCU module 140 senses/monitors the three-phase AC voltage output signals 146 and adjusts/modulates the regulated DC output signal 144 that flows into windings of the excitation rotor 126.

The regulated DC output signal 144 causes the excitation stator 126 to generate an electromagnetic (EM) field. As the excitation rotor 128 rotates within the EM field, currents flow in the windings of the excitation rotor 128. These currents are rectified by the rotating diodes included within the windings of the excitation rotor 128. As such, the AC voltage output signal 129 produced by the excitation rotor 128 is rectified when it is provided to the power motor stage 130.

Figure 2:
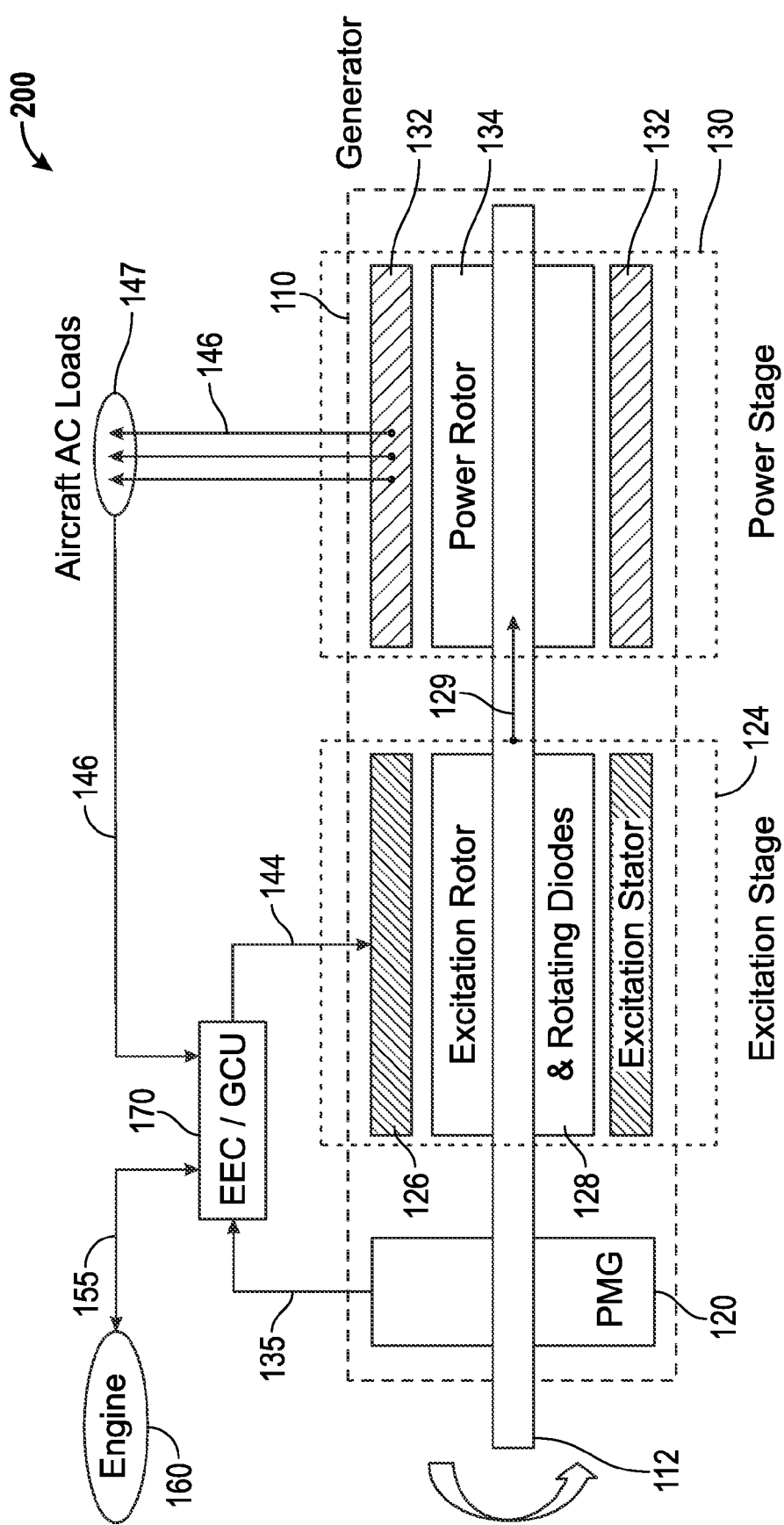
FIG. 2 is a block diagram of a system implemented within an aircraft in accordance with another exemplary implementation of the disclosed embodiments.

In response to the AC voltage output signal 129, the power rotor 134 of the power motor stage 130 generates a rotating field that induces the three-phase AC voltage output signals 146 in the power stator 132, FIG. 2 is a block diagram of a system 200 implemented within an aircraft in accordance with another exemplary implementation of the disclosed embodiments. FIG. 2 includes many of the same elements as shown in FIG. 1, and for sake of simplicity, those elements will not be described again. System 200 differs from the system 100 of FIG. 1 in that the GCU module 140 and the EEC module 150 are co-located and both are implemented within a combined EEC-GCU module 170. For example, in one implementation, the combined EEC-GCU module 170 can include GCU hardware integrated within the combined EEC-GCU module 170, and a processor configured to perform EEC functions to control the engine, and also configured to perform GCU functions to control the compound AC generator 110. As will be described below with reference to FIG. 2, the GCU hardware is in communication with the processor, and the processor is configured to generate commands to the GCU hardware and to control the compound AC generator 110

Figure 3:
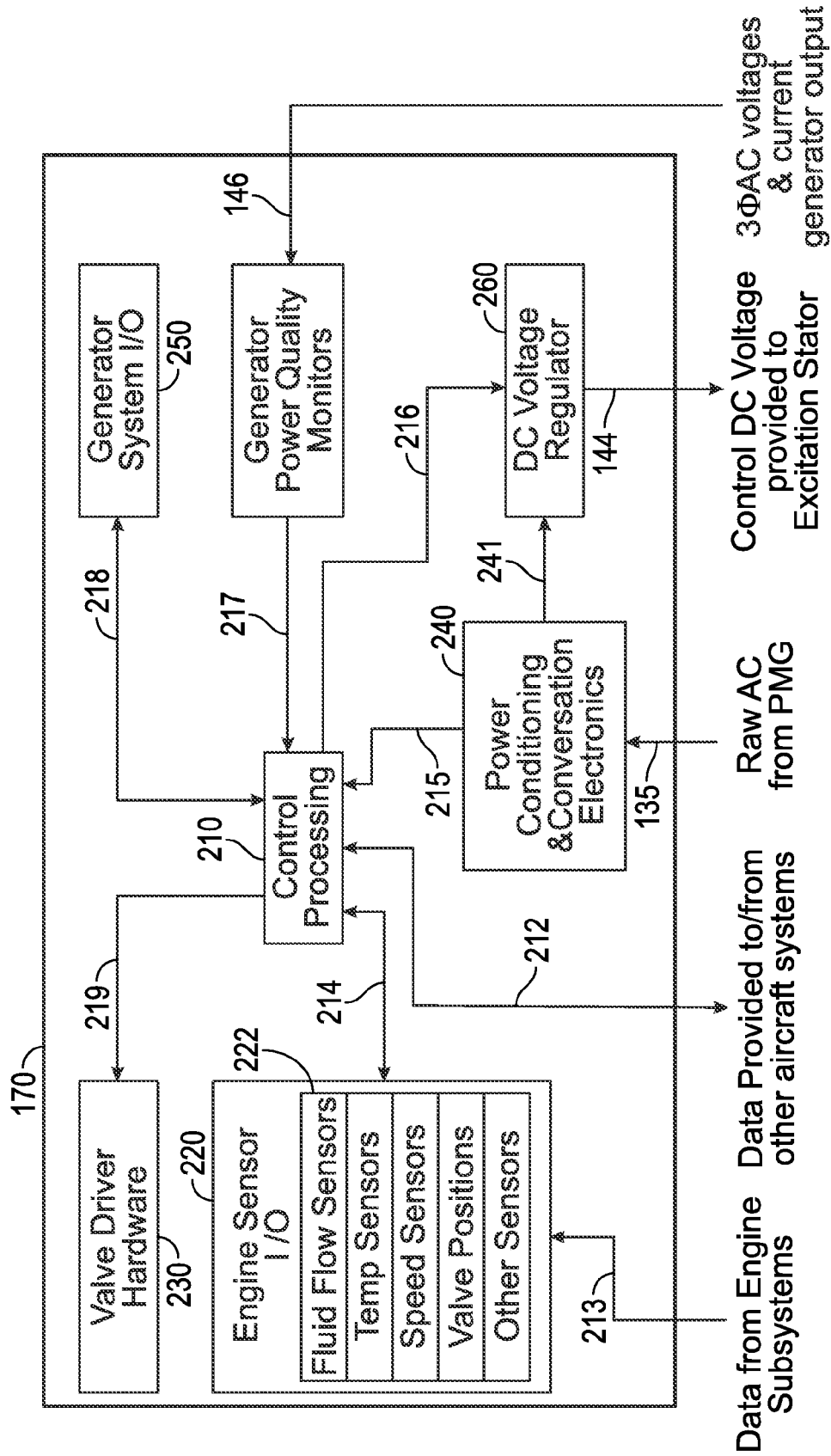
FIG. 3 is a block diagram that illustrates a combined engine electronic controller (EEC)-generator control unit (GCU) module of FIG. 2 in accordance with one exemplary implementation of the disclosed embodiments.

FIG. 3 is a block diagram that illustrates a combined engine electronic controller (EEC)-generator control unit (GCU) module 170 of FIG. 2 in accordance with one exemplary implementation of the disclosed embodiments.

In accordance with the disclosed embodiments, the combined EEC-GCU module 170 includes blocks for performing EEC functions, and also includes additional blocks for performing GCU functions. In this embodiment, the combined EEC-GCU module 170 includes, for example, a processor 210, an engine sensor input-output interface 220, engine valve driver hardware 230, GCU hardware including power conditioning and conversion electronics 240, a generator system input-output interface 250, a DC voltage regulator 260, and a generator power quality monitoring module 270.

The processor 210 is communicatively coupled to the engine sensor input-output interface 220, the engine valve driver hardware 230, the power conditioning and conversion electronics 240, the generator system input-output interface 250 and the DC voltage regulator 260 using any type of connections between the processor 210 and each of those blocks. The processor 210 performs the computation and control functions, and may comprise any type of processor 210 or multiple processors 210, single integrated circuits such as a microprocessor, or any suitable number of integrated circuit devices and/or circuit boards working in cooperation to accomplish the functions of a processing unit.

The processor 210, the engine sensor input-output interface 220, the engine valve driver hardware 230 and the power conditioning and conversion electronics 240 are used in performing the EEC functions. In addition, the processor 210, the power conditioning and conversion electronics 240, the generator system input-output interface 250, the DC voltage regulator 260 and the generator power quality monitoring module 270 are used in performing the GCU functions. The processor 210 and power conditioning and conversion electronics 240 are used in performing both EEC and GCU functions. As such, the need to include separate EEC and GCU modules can be eliminated in accordance with this embodiment.

The engine sensor input-output interface 220 receives data 213 from various engine sub-systems (not illustrated), and provides it to the various sensors 222 that may include, for example fluid flow sensors, temperature sensors, speed sensors, valve position sensors, etc. The sensors 222 generate sensor data output signals 214 that are provided to the processor 210.

As part of the EEC functions, the processor 210 processes data 212 provided from various aircraft systems, the sensor data output signals 214 and the processed AC signal 215 to generate engine valve control signals 219 that are provided to the engine valve driver hardware 230 to control the engine of the aircraft. The processor 210 also provides data 212 to other aircraft systems.

As part of the GCU functions, the generator power quality monitoring module 270 receives the three-phase AC output signal 146 from the power stator 132 of the compound AC generator 110, and generates a generator output power quality signal 217. The power conditioning and conversion electronics 240 receive the AC power signal 135 output from the PMG 120, and generate the processed AC signal 215 that is provided to the processor 210, and the output signal 241 that is provided to the DC voltage regulator 260. The processor 210 generates a voltage regulator control signal 216 that is provided to the DC voltage regulator 260 along with an output signal 241 from the power conditioning and conversion electronics 240. The DC voltage regulator 260 processes the voltage regulator control signal 216 and the output signal 241 to generate the regulated DC output signal 144 that is provided as a control voltage to the excitation stator 126 of FIG. 2.

Those of skill in the art would further appreciate that the various illustrative modules and circuits, described in connection with the embodiments disclosed herein may be implemented as electronic hardware, computer software, or combinations of both. Some of the embodiments and implementations are described above in terms of functional and/or logical block components (or modules). However, it should be appreciated that such block components (or modules) may be realized by any number of hardware, software, and/or firmware components configured to perform the specified functions. To clearly illustrate this interchangeability of hardware and software, various illustrative components, blocks, modules and circuits have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The systems described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system, comprising:
   a compound AC generator comprising: a permanent magnet generator (PMG) configured to be driven by a shaft to generate an AC power signal;
   an engine electronic controller (EEC) module that is configured to control an engine; and
   a generator control unit (GCU) module that is configured to control the compound AC generator, wherein the PMG is coupled to the GCU module and the EEC module such that the compound AC generator is configured to simultaneously supply the AC power signal to the GCU module and to the EEC module.

2. A system according to claim 1, wherein the AC power signal from the PMG of the compound AC generator provides electrical power to the EEC module and to the GCU module.

3. A system according to claim 1, wherein the GCU module and the EEC module are co-located within a combined EEC-GCU module such that the GCU module and the EEC module are both implemented within the combined EEC-GCU module.

4. A system according to claim 3, wherein the combined EEC-GCU module comprises:
   a processor configured to perform EEC functions to control the engine and to perform GCU functions to control the compound AC generator.

5. A system according to claim 4, wherein the combined EEC-GCU module comprises:
   GCU hardware integrated within the combined EEC-GCU module.

6. A system according to claim 5, wherein the GCU hardware is communicatively coupled with the processor, wherein the processor is configured to generate commands to the GCU hardware and to control the compound AC generator.

7. A system according to claim 5, wherein the combined EEC-GCU module comprises:
the processor;
an engine sensor input-output interface; and
engine valve driver hardware;
wherein the GCU hardware comprises: power conditioning and conversion electronics of the combined EEC-GCU module;
a generator system input-output interface;
a DC voltage regulator; and
a generator power quality monitoring module.

8. A system according to claim 7, wherein the processor, the engine sensor input-output interface, the engine valve driver hardware and the power conditioning and conversion electronics are used in performing the EEC functions.

9. A system according to claim 7, wherein the processor, the power conditioning and conversion electronics, the generator system input-output interface, the DC voltage regulator and the generator power quality monitoring module are used in performing the GCU functions.

10. A system according to claim 7, wherein the processor and power conditioning and conversion electronics are used in performing both EEC and GCU functions.

11. A system according to claim 1, wherein the system is implemented within an aircraft, and wherein the aircraft does not include a dedicated and independent permanent magnet alternator (PMA) configured to power the EEC module.

12. A system according to claim 1, wherein the compound AC generator further comprises:
an excitation stage configured to generate an AC voltage output signal; and
a power motor stage configured to generate, based on the AC voltage output signal, a plurality of three-phase AC voltage output signals to power loads external to the compound AC generator.

13. A system according to claim 12, wherein the GCU is configured to generate a regulated DC output signal, and wherein the excitation stage comprises:
an excitation stator configured to generate an electromagnetic field; and
an excitation rotor comprising windings that include rotating diodes to rectify a regulated DC output signal, wherein the excitation rotor is configured to: rotate within the electromagnetic field to cause currents to flow in the windings, and generate the AC voltage output signal, and
wherein the power motor stage comprises:
a power stator; and
a power rotor is configured to generate, in response to the AC voltage output signal, a rotating field that induces the plurality of three-phase AC voltage output signals in the power stator, wherein the plurality of three-phase AC voltage output signals power loads external to the compound AC generator.

14. A combined engine electronic controller (EEC)-generator control unit (GCU) module, comprising:
a generator control unit (GCU) module configured to perform GCU functions to control a compound AC generator; and
an engine electronic controller (EEC) module configured to perform EEC functions to control an engine, and
wherein the combined EEC-GCU module is configured to be powered by a common AC power signal generated by a permanent magnet generator (PMG) of a compound AC generator.

15. A combined EEC-GCU module according to claim 14, wherein the PMG is configured to be driven by a shaft to generate an AC power signal, and wherein the compound AC generator further comprises:
an excitation stage comprising: an excitation stator; and an excitation rotor that includes rotating diodes, wherein the excitation rotor is configured to generate an AC voltage output signal, and
a power motor stage comprising: a power stator; and a power rotor is configured to generate, in response to the AC voltage output signal, a rotating field that induces a plurality of three-phase AC voltage output signals in the power stator, wherein the plurality of three-phase AC voltage output signals power the load.

16. A combined EEC-GCU module according to claim 15, wherein the AC power signal from the PMG of the compound AC generator provides electrical power to the EEC module and to the GCU module.

17. A combined EEC-GCU module according to claim 16, wherein the PMG is coupled to the GCU module and the EEC module to supply the AC power signal to the GCU module and to the EEC module.

18. A combined EEC-GCU module according to claim 14, wherein the compound AC generator is configured to generate three-phase AC output signals.

19. A combined EEC-GCU module according to claim 14, wherein the generator control unit (GCU) module is configured to regulate three-phase AC output signals generated by the compound AC generator.

20. A combined EEC-GCU module according to claim 14, comprising:
a processor configured to perform the EEC functions to control the engine and to perform the GCU functions to control the compound AC generator.

21. A combined EEC-GCU module according to claim 20, further comprising:
GCU hardware in communication with the processor, wherein the processor is configured to generate commands to the GCU hardware and to control the compound AC generator.

22. A combined EEC-GCU module according to claim 21, further comprising:
an engine sensor input-output interface;
engine valve driver hardware;
power conditioning and conversion electronics;
a generator system input-output interface;
a DC voltage regulator; and
a generator power quality monitoring module,
wherein the processor, the engine sensor input-output interface, the engine valve driver hardware and the power conditioning and conversion electronics are used in performing the EEC functions to control the engine,
wherein the processor, the power conditioning and conversion electronics, the generator system input-output interface, the DC voltage regulator and the generator power quality monitoring module are used in performing the GCU functions to control the compound AC generator, and
wherein the processor and power conditioning and conversion electronics are used in performing both EEC and GCU functions.

23. An aircraft, comprising:
a load;
an engine;
an engine electronic controller (EEC) module that is configured to control the engine;
a compound AC generator comprising:

a permanent magnet generator (PMG) configured to be driven by a shaft to generate an AC power signal;

an excitation stage comprising: an excitation stator; and an excitation rotor that includes rotating diodes, wherein the excitation rotor is configured to generate an AC voltage output signal, and a power motor stage comprising: a power stator; and a power rotor is configured to generate, in response to the AC voltage output signal, a rotating field that induces a plurality of three-phase AC voltage output signals in the power stator, wherein the plurality of three-phase AC voltage output signals power the load; and a generator control unit (GCU) module that is configured to control the compound AC generator, wherein the GCU module and the EEC module are co-located within a combined EEC-GCU module such that the GCU module and the EEC module are both implemented within the combined EEC-GCU module, and wherein the PMG is directly coupled to the GCU module and the EEC module such that the compound AC generator is configured to simultaneously supply the AC power signal to the GCU module and to the EEC module to provide electrical power to the EEC module and to the GCU module.

* * * * *